(12) United States Patent
Wagner et al.

(10) Patent No.: US 11,519,757 B2
(45) Date of Patent: Dec. 6, 2022

(54) SYSTEM AND METHOD FOR DETERMINING ANGULAR POSITION IN ROTATING MACHINES

(71) Applicant: HONEYWELL INTERNATIONAL INC., Morris Plains, NJ (US)

(72) Inventors: Joel Wagner, Sun City, AZ (US);
Michael Ezzell, Peoria, AZ (US);
Anthony Cline, Scottsdale, AZ (US);
William Taylor, Glendale, AZ (US);
Jon Gilreath, Peoria, AZ (US); Ronald E. Strong, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 160 days.

(21) Appl. No.: 16/899,258

(22) Filed: Jun. 11, 2020

(65) Prior Publication Data
US 2021/0389162 A1 Dec. 16, 2021

(51) Int. Cl.
*G01D 5/245* (2006.01)
*G01D 5/14* (2006.01)

(52) U.S. Cl.
CPC .......... *G01D 5/2454* (2013.01); *G01D 5/145* (2013.01)

(58) Field of Classification Search
CPC .. G01D 5/2454; G01D 5/2455; G01D 5/2457; G01D 5/2458; G01D 5/245; G01D 5/24438; G01D 5/142; G01D 5/145; G01D 5/147; G01D 5/16; G01D 5/165; G01B 7/30
See application file for complete search history.

(56) References Cited

U.S. PATENT DOCUMENTS

| | | | | |
|---|---|---|---|---|
| 4,053,829 A | * | 10/1977 | Maruo | G01D 5/145 324/260 |
| 4,211,452 A | | 7/1980 | Poubeau | |
| 4,475,068 A | | 10/1984 | Brailsford | |
| 4,732,353 A | | 3/1988 | Studer | |
| 4,774,463 A | * | 9/1988 | Mizobuchi | G01P 3/486 356/27 |
| 5,623,409 A | | 4/1997 | Miller | |
| 5,625,239 A | | 4/1997 | Persson et al. | |
| 5,675,250 A | * | 10/1997 | Berglund | G01D 5/145 324/207.2 |
| 5,731,645 A | | 3/1998 | Clifton et al. | |
| 5,942,863 A | | 8/1999 | Wada | |
| 6,104,186 A | * | 8/2000 | Yamada | F02P 7/07 324/174 |

(Continued)

FOREIGN PATENT DOCUMENTS

WO 2018/166806 A1 9/2018
WO 2019/177603 A1 9/2019

*Primary Examiner* — David M Schindler
(74) *Attorney, Agent, or Firm* — Lorenz & Kopf, LLP (57) ABSTRACT

Systems and methods for determining angular position in rotating machines. A repeating sequence of segments are arranged in a track disposed at a diameter around a shaft of a rotor that rotates about an axis. A sensor is positioned to face the track and is fixed relative to the stator. The track and the sensor face to each other, which may be in directions that are parallel to the axis. The sensor generates an output that is decoupled from the diameter of the track and is related to the repeating sequence of segments.

19 Claims, 6 Drawing Sheets

(56) References Cited

U.S. PATENT DOCUMENTS

| | | | |
|---|---|---|---|
| 6,211,794 B1 * | 4/2001 | DeSoto | G01D 5/145 340/686.1 |
| 6,218,750 B1 | 4/2001 | Nakagawa | |
| 6,313,624 B1 * | 11/2001 | Alhorn | G01B 7/30 310/68 B |
| 6,522,130 B1 * | 2/2003 | Lutz | G01B 7/30 310/68 B |
| 6,679,457 B1 | 1/2004 | Meffe et al. | |
| 6,859,002 B2 | 2/2005 | Desbiolles et al. | |
| 6,930,423 B2 | 8/2005 | Kitazawa | |
| 7,034,524 B2 * | 4/2006 | Schumacher | G01D 5/2451 324/207.25 |
| 7,723,886 B2 | 5/2010 | Huber et al. | |
| 8,193,748 B2 | 6/2012 | Deller et al. | |
| 8,324,892 B2 | 12/2012 | Rudel et al. | |
| 8,587,296 B2 | 11/2013 | Ueda | |
| 8,816,675 B2 | 8/2014 | Kinashi | |
| 8,918,236 B2 | 12/2014 | Hamilton | |
| 8,988,068 B2 | 3/2015 | Ludwig | |
| 9,618,528 B2 | 4/2017 | Lesikar | |
| 2004/0119465 A1 * | 6/2004 | Clark | G01D 11/30 324/207.2 |
| 2008/0099626 A1 | 5/2008 | Bialke | |
| 2010/0156401 A1 * | 6/2010 | Nishiguchi | G01D 5/208 324/207.25 |
| 2010/0308808 A1 | 12/2010 | Yamagata et al. | |
| 2012/0182009 A1 * | 7/2012 | Ueda | G01D 5/145 324/207.25 |
| 2017/0115134 A1 * | 4/2017 | Wolf | G01D 5/145 |
| 2017/0292855 A1 | 10/2017 | Kaste | |
| 2018/0356254 A1 | 12/2018 | Kegeler | |
| 2019/0028009 A1 | 1/2019 | Shimokawa et al. | |
| 2019/0086238 A1 | 3/2019 | Moriyama et al. | |
| 2019/0265073 A1 | 8/2019 | Duret et al. | |
| 2020/0166376 A1 | 5/2020 | Bruwer et al. | |

\* cited by examiner

SYSTEM AND METHOD FOR DETERMINING ANGULAR POSITION IN ROTATING MACHINES

TECHNICAL FIELD

The present invention generally relates to determining angular position in rotating machines, and more particularly relates to determining absolute angular position using a device having features with a periodicity that generates a desired output for control purposes.

BACKGROUND

Various types of rotating machines are used in applications where position information is needed for control purposes such as to control motion. For example, angular position may be used to derive speed. Also as an example, electronically commutated motors may rely on a determination of angular position of the rotor to provide information to commutate the motor. Typical DC motor commutation may rely on some form of hall sensor or optical position encoder to provide the position information. In a number of applications these options may be relatively costly and may be complicated to implement.

In some applications a gear toothed wheel has been used in combination with a gear tooth sensor. This alternative is relatively straight-forward to implement and generally has a relatively low cost. Output from this type of sensor corresponds with the number of gear teeth passing in front of it. When a gear tooth aligns with the sensor, the sensor's output may increase and when the gear tooth or magnetic pole moves away from the sensor, the output may decrease. This repeats at every tooth resulting in a sinusoidal output. These sensors are generally designed to work with certain defined gear tooth pitches. In applications that require a large number of gear teeth, the size of the resulting gear often requires redesign of the motor and as a result, implementing this alternative may become impractical.

Accordingly, it is desirable to provide alternative systems and methods for determining angular position between two or more relatively rotating bodies, including in applications with limited packaging space. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Systems and methods are provided for determining angular position in rotating machines. In a number of embodiments, a machine with a rotor has a repeating sequence of segments that are arranged in a track. The track is disposed at a diameter around a shaft of the rotor and rotates about an axis with the rotor. A sensor is positioned to face the track and is fixed relative to the stator. The track and the sensor may be disposed in a common plane and face each other. The sensor generates an output that is decoupled from the diameter of the track and is related to the repeating sequence of segments.

In a number of additional embodiments, a method for determining angular position includes arranging a repeating sequence of segments in a track disposed at a diameter around a shaft. A sensor is positioned facing the track so that the track and the sensor rotate relative to each other about an axis. The track and the sensor are mounted to face each other. The sensor generates an output that is decoupled from the diameter of the track and is related to the repeating sequence of segments In other embodiments, a system for determining angular position of an electrical machine includes a rotor with a shaft and a track having a repeating sequence of segments arranged around the shaft at a diameter of the track. The rotor rotates about an axis. A printed circuit board assembly does not move relative to a stator, encircles the shaft, and includes driver electronics of the electrical machine. The printed circuit board assembly includes a sensor facing the track, with the sensor and track facing each other, which may be in directions that are parallel to the axis. The sensor generates an output that is decoupled from the diameter of the track and is related to the repeating sequence of segments.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In a number of embodiments as described herein, an output such as a sine and cosine waveform pair is desirable, such as to indicate the angular position of a rotating machine. A sine and cosine output pair provides a unique indication of any angular position of the machine. An annular track includes a feature shaped to produce the desired output and is carried with a part of the machine, such as around the shaft of the rotor. At least one sensor is carried with another part of the machine, such as its stator, and is positioned to generate a signal responsive to the moving track. The track has a feature that repeats in intervals at a periodicity. The diameter of the track is decoupled from the output because the desired periodicity may be produced at any of various sized diameters around the shaft by changing the shape of the track's feature. In a number of embodiments, the sensor(s) may be disposed on a common printed circuit board with other control components such as the drive electronics for the machine. In embodiments, this enables generating a signal for commutation where the shape of the track may be altered to match various desired numbers of pole pairs, without a need to change the diameter and packaging space needed.

Figure 1:
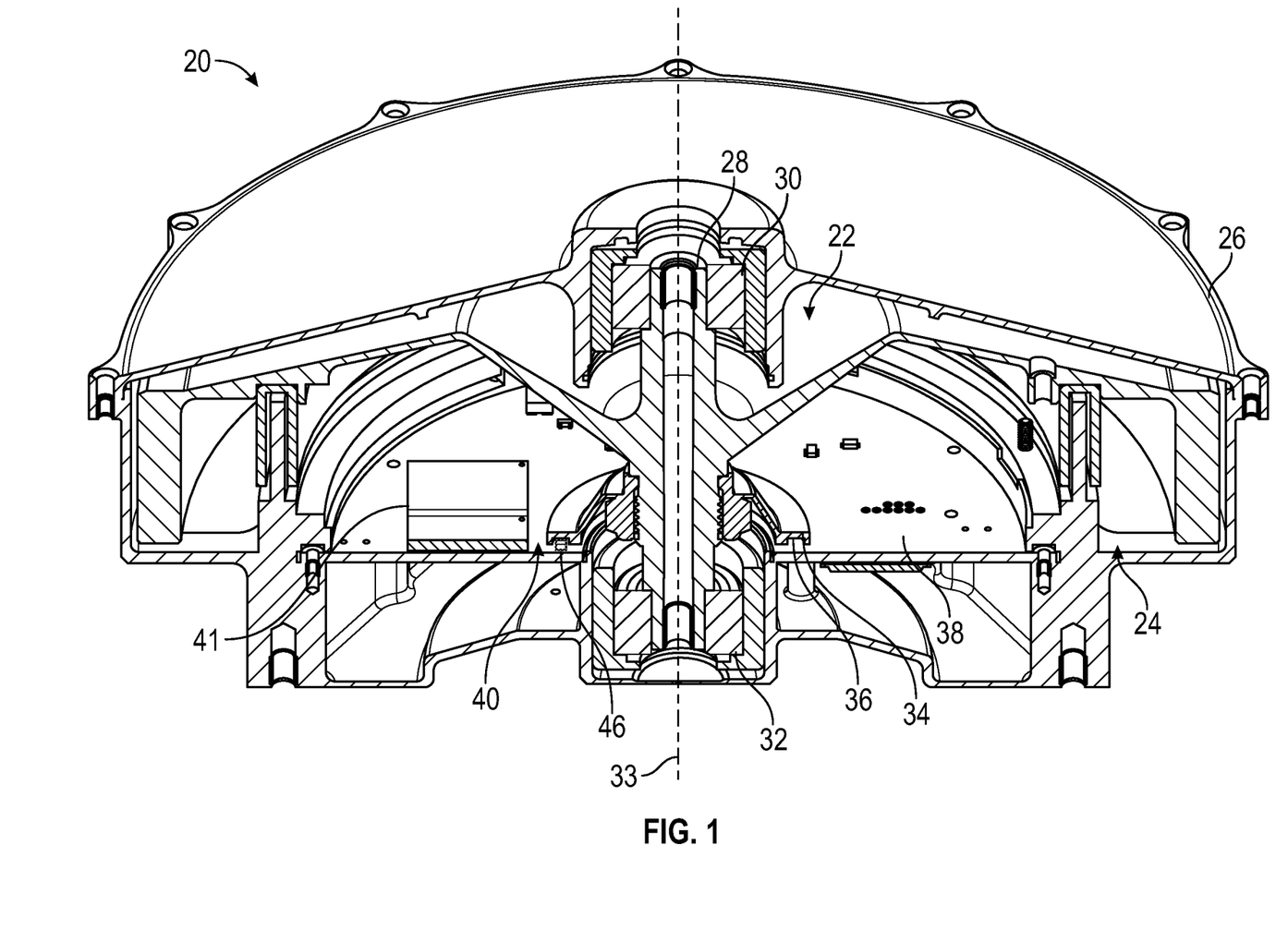
FIG. 1 is a fragmentary, perspective, sectioned illustration of a rotating machine in the form of a motor, according to an exemplary embodiment.

Referring to FIG. 1, an embodiment is illustrated as electrical machine 20 in the form of a brushless DC motor. The machine 20 generally includes a pair of relatively rotatable components/bodies in the form of a rotor 22 and a stator 24 in this embodiment. The rotor 22 and the stator 24 are carried in a housing 26. The rotor 22 includes a shaft 28 supported in the housing 26 by bearing assemblies 30, 32 to rotate about an axis 33 of rotation. A ring 34 is carried by the rotor 22 to move therewith and includes a track 36. In other embodiments, the ring 34 may be formed as a disk or other shape to carry the track 36. The track 36 is generally annular in shape, surrounds the shaft 28, may be continuous or stepped, and includes a feature in the form of a shaped, repeating pattern to produce a desired output. The stator 24 may be fixed to the housing 26 along with a printed circuit board assembly (PCBA) 38, or in some embodiments may move relative thereto. The PCBA 38 includes a printed circuit board 39 and electronic elements 40 for control purposes, which in the current embodiment includes circuit components of the motor drive electronics 41 for the machine 20. The PCBA 38 also carries at least one sensor 46 positioned adjacent to and facing the track 36 to produce a signal in response to relative movement of the track 36.

Figure 2:
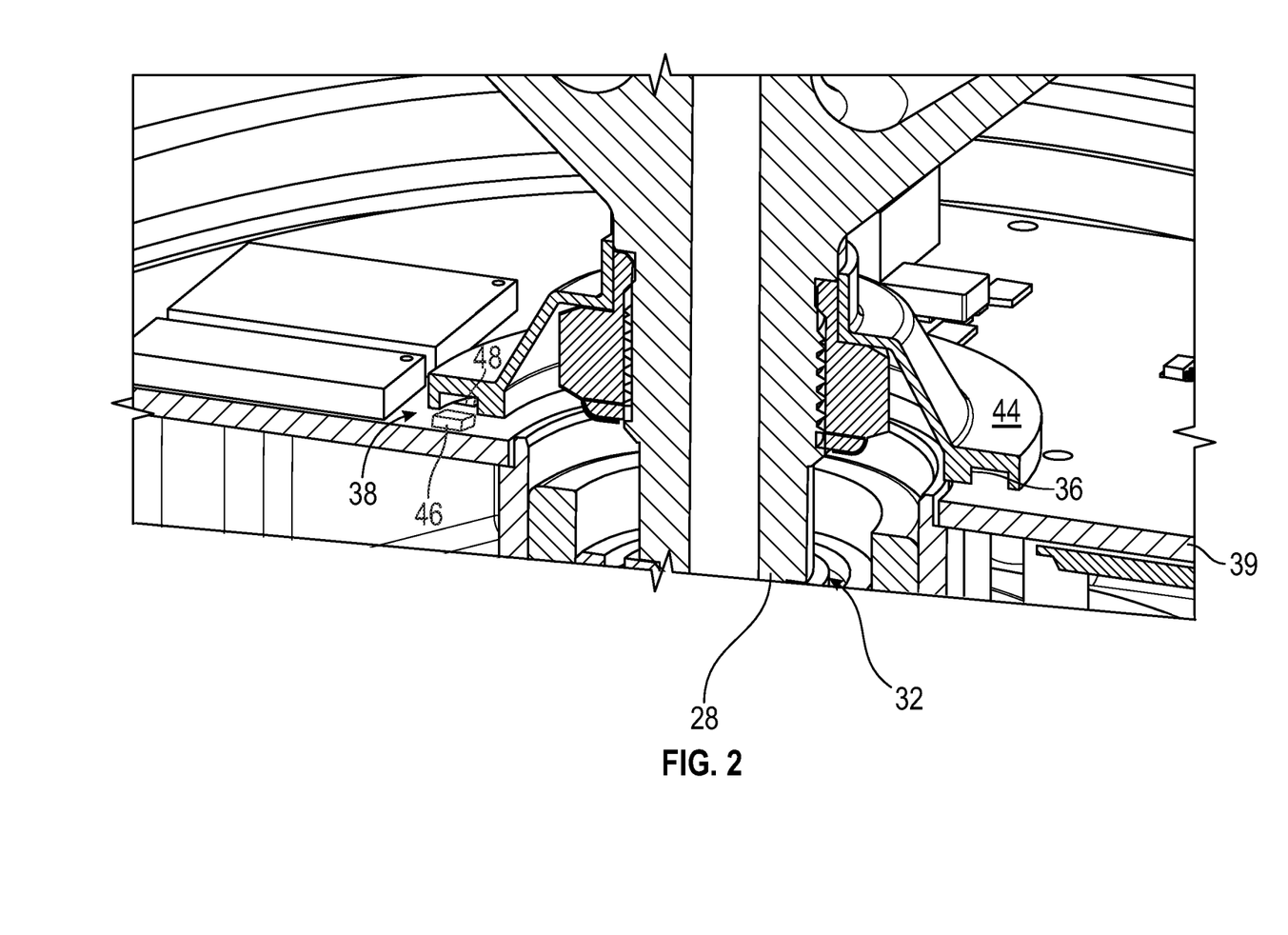
FIG. 2 is a fragmentary, perspective, sectioned illustration of part of the rotating machine of FIG. 1, according to an exemplary embodiment.

As shown in FIG. 2, the track 36 is part of a disk 44 that is fixed to the shaft 28. A pair of sensors 46, 48 are disposed on the printed circuit board 39 adjacent the track 36. The sensors 46, 48 have tangential spacing to create concurrent sine and cosine outputs in response to relative movement of the track 36. In the current embodiment, the sensors 46, 48 are magneto-resistive sensors in the form of chips mounted to the printed circuit board 39 as part of the PCBA 38. In other embodiments another type of sensor, such as an inductive may be used.

Figure 3:
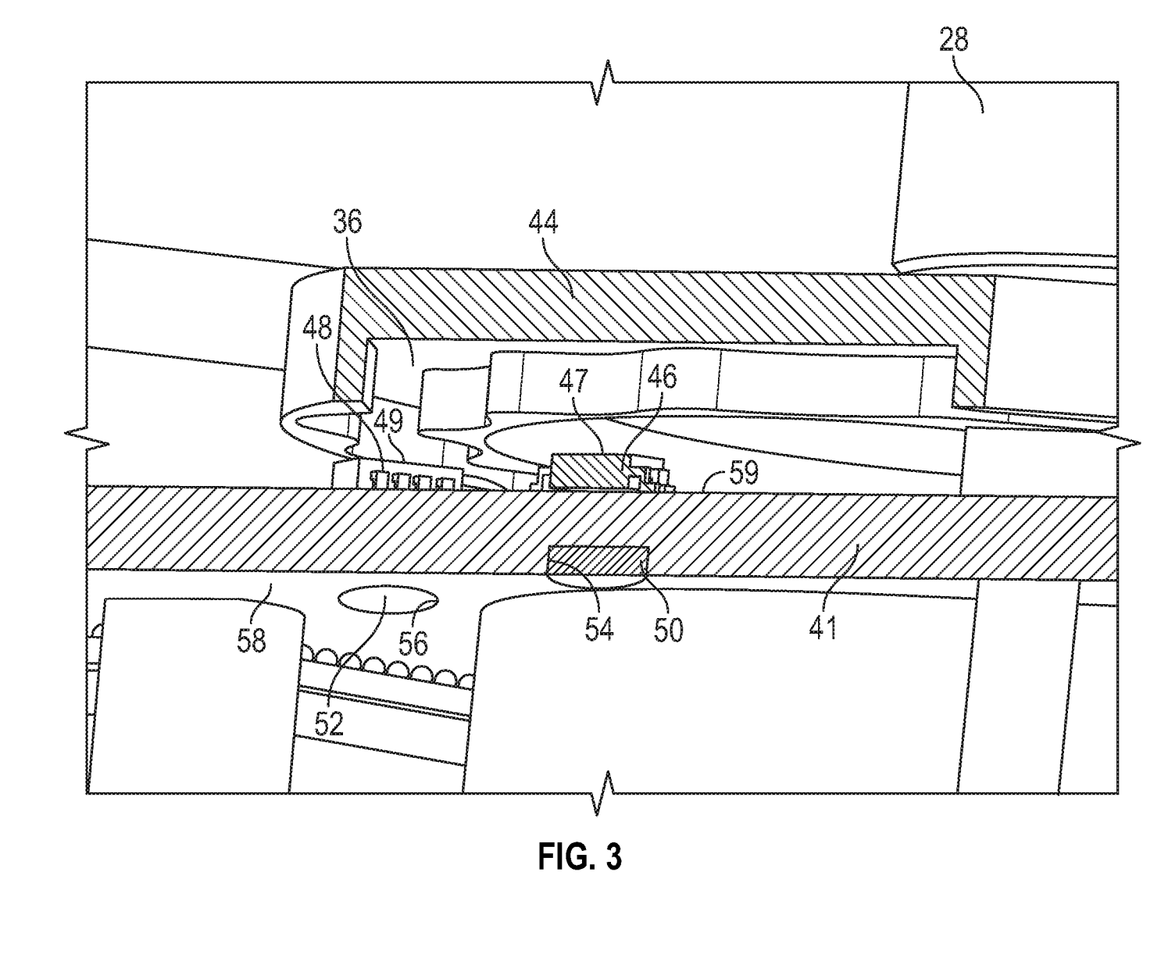
FIG. 3 is a fragmentary, perspective, sectioned illustration of part of the rotating machine of FIG. 1 showing a ferromagnetic ring and sensor arrangement, according to an exemplary embodiment.

As shown in FIG. 3, a pair of bias magnets 50, 52 are disposed in openings 54, 56 respectively in the printed circuit board 39. In a number of embodiments, the magnets 50, 52 may be bonded to the surface 58 of the printed circuit board 39 opposite the surface 59 to which the sensors 46, 48 are mounted. The magnet 50 is aligned with the sensor 46 and the magnet 52 is aligned with the sensor 48. The magnets 50, 52 provide biasing by generating static magnetic fields and the sensors 46, 48 detect magnetic field variations as the track 36 moves past their surfaces 47, 49. The output from the sensors 46, 48 corresponds with ferromagnetic features of the track 36 passing near them. In the current embodiment, the features are configured to generate sinusoidal outputs as a sine and cosine pair from the sensors 46, 48. The output may be converted to angle steps to identify the angular position of the rotor 22.

Figure 4:
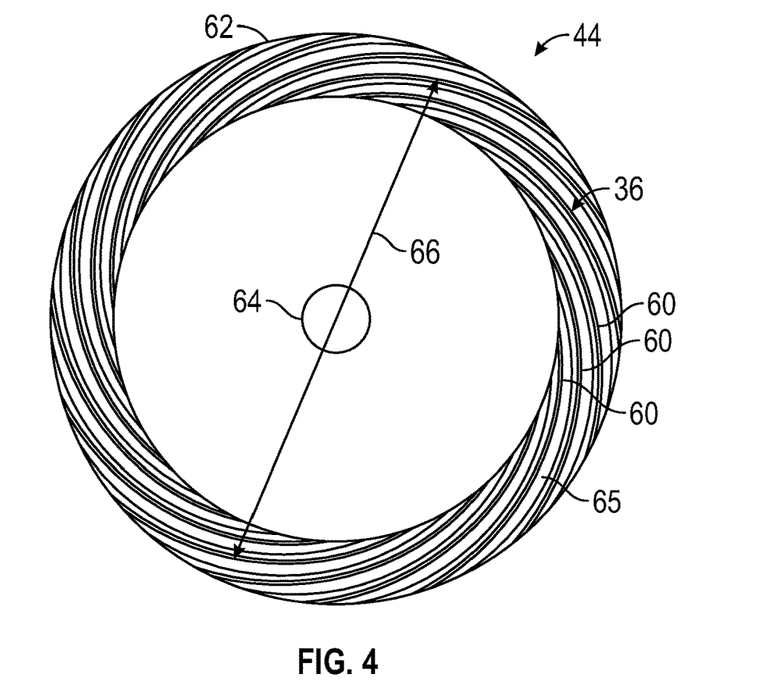
FIG. 4 is an illustration of a disk with a spiral-type track for use with the rotating machine of FIG. 1, according to an exemplary embodiment.

An embodiment of the disk 44 is illustrated in FIG. 4 and includes the track 36 configured with a ferrous spiral design. The track 36 includes a number of identical spiral shaped ridges 60 near its outer perimeter 62 and an opening 64 at its center to receive the shaft 28. The track 36 is centered on a diameter 66. As a ridge 60 passes one of the sensors 46, 48 variation of the output results. A maximum of output from the respective sensor 46, 48 corresponds with the ridge 60 passing by. When a ridge 60 moves to a position in front of the sensor 46, 48, the output ramps up and when the ridge 60 moves away, the output ramps down. The cycle repeats at every ridge 60 resulting in a sinusoidal output. The sinusoidal output is accomplished due to the curvature of the ridges 60 and the height variation. In this embodiment, a total of sixteen ridges 60 are included, which corresponds to providing an output for thirty-two poles (sixteen pole pairs) of the machine 20 for use in commutation. The amplitude of the output may be varied by varying the height of the ridges 60 relative to the grooves 65 between the ridges 60. Each ridge 60-groove 65 pair forms a segment of the track 36 that repeats around its circumference. The diameter 66 of the track 36 may be changed to fit available packaging space and the same output may be generated such as by changing the curvature of the ridges 60. Accordingly, the diameter 66 of the track 36 is decoupled from the output so that the same output may be obtained by various diameters 66.

Figure 5:
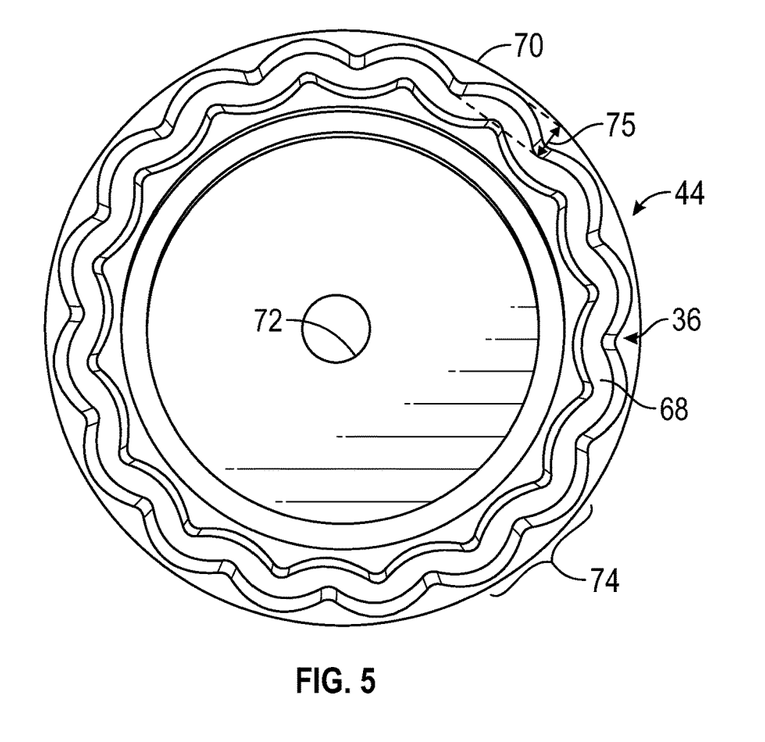
FIG. 5 is an illustration of a disk with a grooved track for use with the rotating machine of FIG. 1, according to an exemplary embodiment.

As illustrated in FIG. 5, an embodiment of the disk 44 includes the track 36 configured as a negative groove 68 formed into the disk 44 near its outer perimeter 70. An opening 72 at the center of the disk 44 is provided for receiving the shaft 28. The groove 68 may be formed concurrently with the disk 44 of a ferro-magnetic material, such as by casting or additive manufacturing, or may be machined in. The groove 68 has a sinusoidal shape with a number of repeating segments 74 in a sequence. The segment 74 repeats at intervals 360-degrees around the shaft 28 with a periodicity. The number of individual segments 74 and their amplitude is selected based on the desired output so that the periodicity of the track 36 coincides with that of the desired output. The amplitude of the output may be varied by varying the height 75 of the track 36, which corresponds to the variation of one-half the segment 74.

Figure 6:
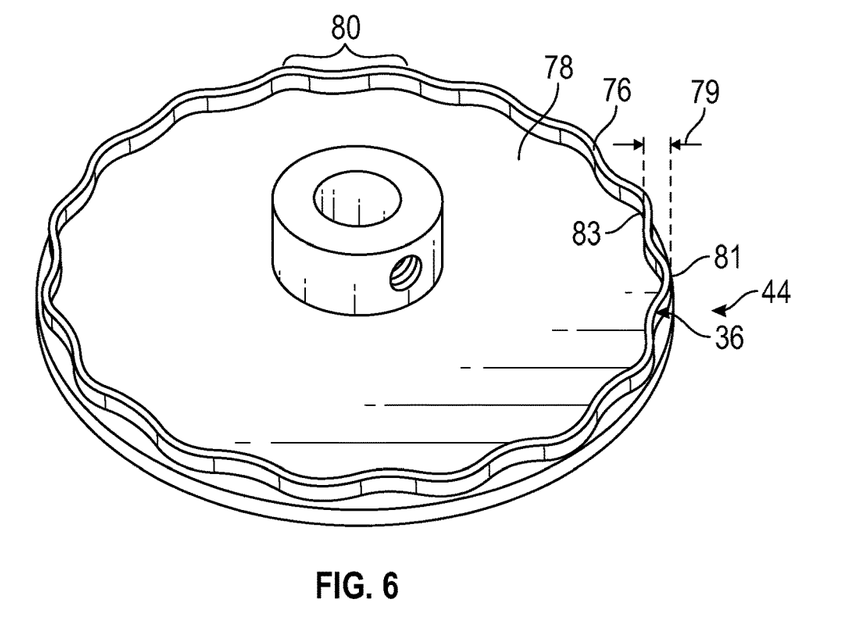
FIG. 6 is an illustration of a disk with a ridged track for use with the rotating machine of FIG. 1, according to an exemplary embodiment.

FIG. 6 illustrates an embodiment of the disk 44 with the track 36 configured as a positive ridge 76 projecting from the surface 78. The ridge 76 may be formed concurrently with the disk 44 of a ferro-magnetic material, or may be added as a separate piece. When the ridge 76 is added, the remainder of the disk 44 may be formed of a non-magnetic material. When embodied as a separate piece, the ridge 76 may be adhered, bonded, fastened, fused or otherwise attached to the surface 78. In this embodiment, the ridge 76 has a sinusoidal shape composed of a repeating sequence of segments 80 and is configured to generate a sinusoidal response from the sensors 46, 48. The number of individual segments 80 and their amplitude is selected to produce the desired output. The amplitude of the output may be varied by varying the height 79 of the ridge 76 between an outermost point 81 and an innermost point 83.

Figure 7:
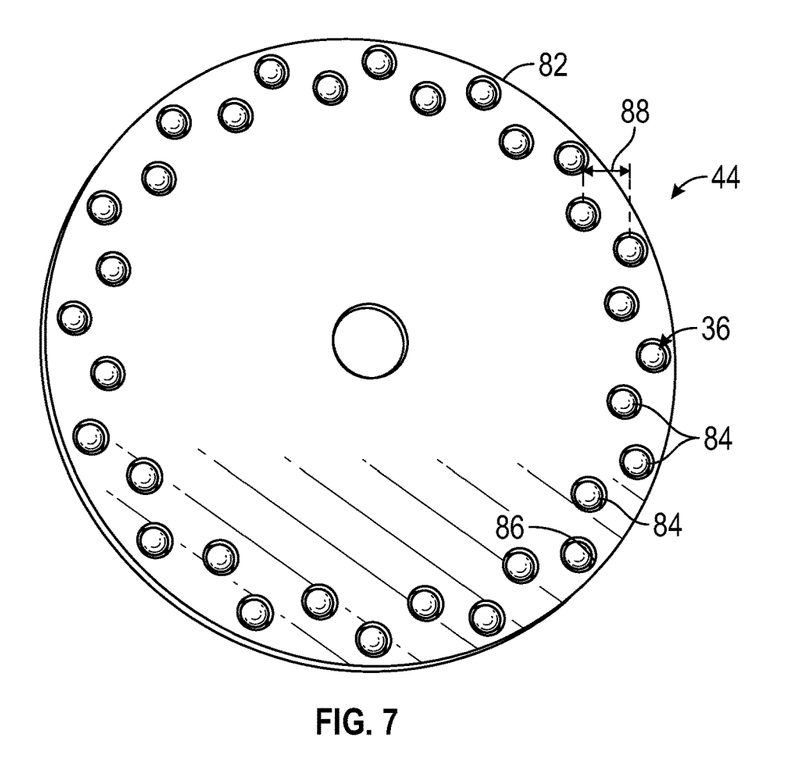
FIG. 7 is an illustration of a disk with an embedded ball track for use with the rotating machine of FIG. 1, according to an exemplary embodiment.

As illustrated in FIG. 7, the track 36 may be non-continuous or stepped around the perimeter 82 of the disk 44. In this embodiment, the track 36 is a series of spaced steps in the form of ferro-magnetic elements (balls) 84 embedded in the disk 44. The elements 84 are positioned in a sinusoidal-like trail of the track 36 so that one element 84 results in a high output from the respective sensor 46, 48 and the next element 84 results in a low output from the respective sensor 46, 48. The result is a sinusoidal output from the sensor 46, 48 as the track 36 rotates. The elements 84 may be made of a ferromagnetic material and the disk 44 may be made of a nonmagnetic material. In this embodiment, the elements 84 are secured in holes 86 bored in the disk 44. In other embodiments, the elements 84 may be secured to the surface of the disk 44. The number of individual elements 84 and the height 88 of their positioning is selected based on the desired output. In some embodiments, such as when an on-off pulsed output is desired, the elements 84 may be spaced apart in a circular track 36 so that when an element passes a sensor 46, 48 a pulse is generated and when the sensor 46, 48 is disposed between elements 84 no pulse is generated. The amplitude of the output may be varied by varying the height 88 of the trail between an outer element 84 and an adjacent inner element 84.

Figure 8:
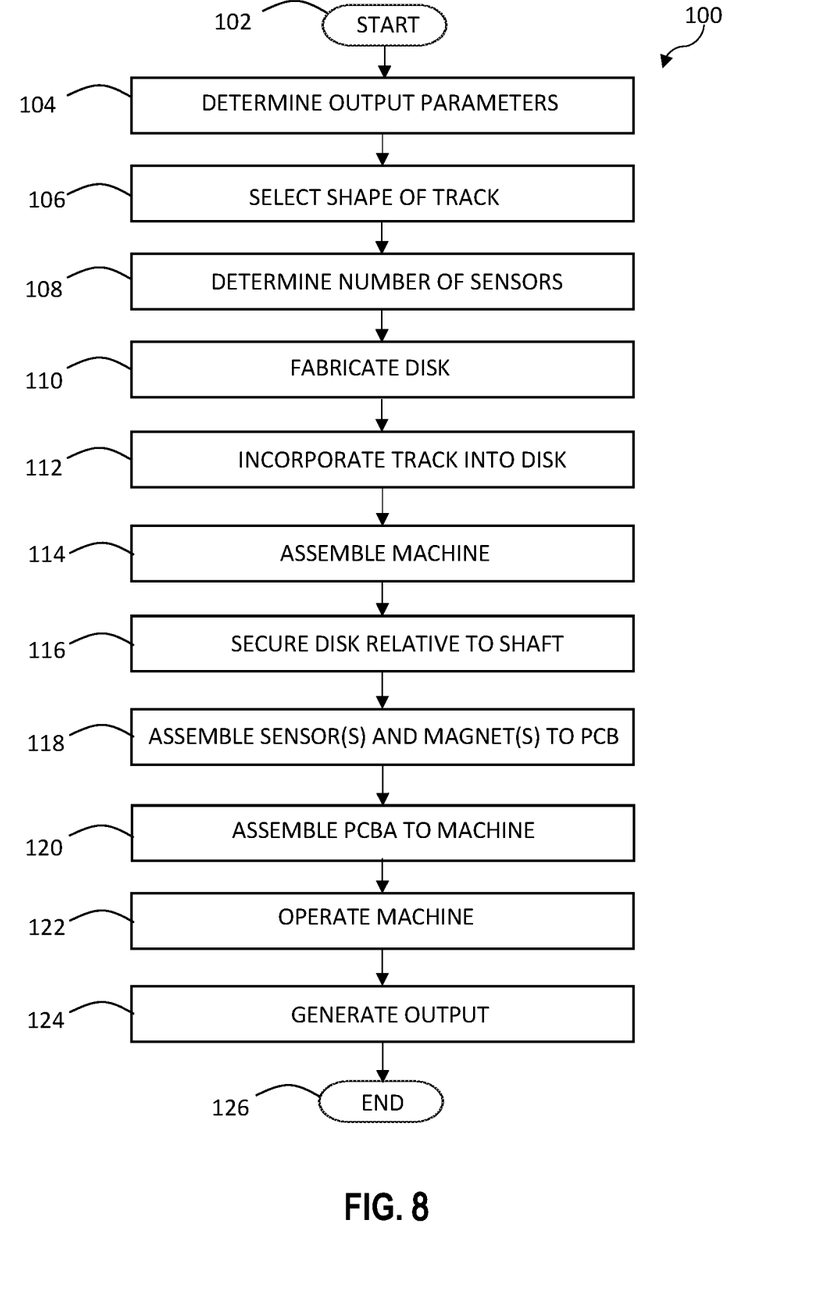
FIG. 8 is a flowchart of a method of determining angular position, according to an exemplary embodiment.

A process 100 for determining angular position is depicted in FIG. 8. The process begins 102 and the parameters of the output are determined 104. For example, the nature of the output such as whether it will be sinusoidal, pulsed or otherwise is determined 104. In addition, the period of the output is determined 104. As an example, for purposes of commutating a motor with thirty-two poles, sixteen ridges 60, segments 74, 80 or thirty-two elements 84 are employed and are distributed 360 degrees around the disk 44. This generates sixteen cycles per rotation. So, the machine 20, as an aspect of the track 36, contains a plurality of features whose periodicity exactly coincides with the periodicity of features on at least one of the relatively rotating bodies (16 segments coinciding with motor magnetic pole pairs of 16 being one example). This means the diameter of the track is decoupled from the output because the desired periodicity may be produced at any of various sized diameters around the shaft by changing the shape of the track's feature. In addition, the amplitude of the output needed is determined 104. The amplitude is varied by varying the height 75, 79, 88 of the track 36, or the height of the ridges 60. Height is a distance between the part of the track 36 that generates the high point of the output and the part of the track that generates the low output. The illustrated designs of FIGS. 4-7 desirably create a large amplitude, well-shaped sinusoidal wave, with a minimum of extraneous electrical noise.

Continuing with the process 100, the shape of the track is selected 106. Factors determining the selected shape include preferred manufacturing process, the nature of the output, and the amplitude of the output. For example, for a sinusoidal output, any of the tracks 36 as illustrated in FIGS. 4-7 may be selected 106. The number of sensors needed is determined 108. For example, when sine and cosine inputs are needed by the applicable use of commutation, two sensors 46, 48 are used and are spaced tangentially to provide sine and cosine outputs. When only one output is needed, one sensor 46 or 48 may be used.

The disk 44 is then fabricated 110 and the track 36 is incorporated 112 into the disk 44. For example, the disk 44 of FIG. 4 may be cast of a ferromagnetic material and the grooves 65 may be machined to form the spiral ridges 60. In the embodiment of FIG. 5, the disk 44 may be cast with the groove 68 formed as part of the casting. For the embodiment of FIG. 6, the disk 44 with the ridge 76 may be formed, such as by additive manufacturing, or the ridge 76 may be secured to the disk 44 after its formation. With regard to the embodiment of FIG. 7, the disk 44 may be formed or machined and the holes 86 may be incorporated or bored, after which the elements 84 may be inserted.

The machine 20 is assembled 114 with the disk 44 secured 116 relative to the shaft 28. The sensors 46, 48 are assembled 118 on the printed circuit board 39 and the magnets 50, 52 are added to the printed circuit board 39 opposite the sensors 46, 48 with the sensors 46, 48 and the magnets 50, 52 being part of the PCBA 38. In the current embodiment, the PCBA 38 includes the motor drive electronics 41 for the machine 20. The PCBA 38 is assembled 120 in the machine 20 encircling the shaft 28 so that the track 36 faces and is disposed adjacent the sensors 46, 48. Both the track 36 and the sensors 46, 48 face (each other) in directions that are parallel to the axis of rotation 33 in this embodiment, which provides improved packaging. In other embodiments, the track 36 and the sensors 46, 48 may be oriented differently. The machine 20 is operated 122 with the rotor 22 rotating relative to the stator 24. As the track 36 passes the sensors 46, 48 sine and cosine outputs are generated 124 and the process 100 ends 126. In a number of embodiments, an output of up to 400 mV peak to peak may be generated.

Through the examples described herein, usable electrical outputs such as sine and cosine waveforms are generated in a machine using a track and at least one sensor. The sensor(s) may be mounted on the same printed circuit board 39 as the driver electronics for the machine. Movement of the track varies a magnetic field generated by bias magnets for sensing by the sensors. The sensors are disposed in the same plane as the printed circuit board for the driver electronics and the ring rotates with the machine's shaft and the track faces the sensors. The generated output may be used to determine absolute angular position from which angular speed may be derived for a number of uses including for motor commutation. The diameter of the track may vary and the desired output is tailored by the features of the track.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for determining angular position comprising:
a first body including a shaft, a flat disk having a circumference, and a track having segments arranged around the shaft at a diameter of the track in a repeating sequence, the track located on the disk, the segments defined by ridges and grooves alternating around and extending from the circumference, the ridges being spiral shaped and identical, wherein a ridge-groove pair of the ridges and grooves defines one of the segments; and a second body, including a sensor facing the track, wherein the first and second bodies rotate relative to each other about an axis, wherein the track includes a height in each of the segments between a peak of a respective one of the ridges of the respective segment and a bottom of a respective one of the grooves of the respective segment, wherein the track and the sensor face each other;

wherein the sensor is configured to generate an output that is decoupled from the diameter of the track and is related to the repeating sequence of segments, wherein an amplitude of the output is related to the height, wherein a period of the output is related to the repeating sequence of segments, wherein the sensor is a magnetic sensor.

2. The system of claim 1, wherein the track extends three-hundred-sixty degrees around the shaft.

3. The system of claim 1, wherein the sensor is a first sensor and comprising a second sensor, wherein the first sensor and the second sensor face the track and are disposed relative to one another with a tangential spacing to create concurrent sine and cosine outputs in response to relative movement of the track.

4. The system of claim 1, comprising a printed circuit card assembly, with the sensor disposed on the printed circuit card assembly, wherein a magnet is disposed on an opposite side of the printed circuit card assembly from the sensor.

5. The system of claim 4, wherein the sensor is configured to generate a sinusoidal output as a result of the repeating sequence of segments varying a magnetic field generated by the magnet.

6. The system of claim 1, wherein the track is annular in shape the ridges rising from the flat disk toward the sensor in a direction parallel to the shaft.

7. The system of claim 1, wherein the track comprises a part of the first body with the sensor facing in a direction parallel to the axis and at the track.

8. The system of claim 1, comprising a motor containing the first and second bodies, wherein the period is related to the repeating sequence of the segments by being defined by a total number of the ridges and the grooves, wherein the total number corresponds to a number of poles of the motor.

9. The system of claim 1, comprising a printed circuit card assembly carrying the sensor; and a magnet disposed on an opposite side of the printed circuit card assembly from the sensor and configured to generate a magnetic field, wherein the sensor is configured to sense a variation in the magnetic field caused by rotation of the track.

10. The system of claim 1, wherein the first body is a rotor of an electrical machine having a number of pole pairs, and wherein the ridges and grooves together comprise the number, so that the sensor generates the output useable to commutate the electrical machine.

11. A method for determining angular position comprising:

arranging a flat disk having a repeating sequence of segments in a track disposed at a diameter around a shaft of a first body, the disk having a circumference, the segments defined by ridges and grooves alternating around and extending from the circumference, the ridges being spiral shaped and identical, with a ridge-groove pair of the ridges and grooves defining one of the segments, the track including a height in each of the segments between a peak of a respective one of the ridges of the respective segment and a bottom of a respective one of the grooves of the respective segment;

positioning a sensor on a second body, the sensor facing the track;

configuring the first and second bodies to rotate relative to each other about an axis;

mounting the track and the sensor to face each other;

generating, by the sensor, an output that is decoupled from the diameter of the track, has an amplitude related to the height, and has a period related to a number of the repeating sequence of segments, wherein the sensor is a magnetic sensor.

12. The method of claim 11, wherein the track extends three-hundred-sixty degrees around the shaft, and comprising configuring the track so that as the ridges pass the sensor, the output of the sensor varies sinusoidally.

13. The method of claim 12, comprising aligning a magnet with the sensor, with the sensor disposed between the track and the magnet.

14. The method of claim 12, comprising positioning the sensor on a printed circuit card assembly and positioning a magnet on an opposite side of the printed circuit card assembly from the sensor.

15. The method of claim 14, comprising:

varying a magnetic field generated by the magnet by movement of the repeating sequence of segments; and the movement of the repeating sequence of segments causes the output of the sensor to be sinusoidal.

16. The method of claim 12, comprising:

positioning the sensor on the printed circuit card assembly; and configuring the track with an annular shape.

17. The method of claim 11, wherein the track extends three-hundred sixty degrees around the shaft.

18. The method of claim 11, comprising:

positioning a magnet on an opposite side of the printed circuit card assembly from the sensor; and sensing, by the sensor, a variation in a magnetic field generated by the magnet, the variation caused by rotation of the track.

19. A system for determining angular position of an electrical machine, the system comprising:

a rotor including a shaft, a flat disk having a circumference, and a track having segments arranged around the shaft at a diameter of the track in a repeating sequence, the track located on the disk, the segments defined by ridges and grooves alternating around and extending from the circumference, the ridges being spiral shaped and identical, wherein a ridge-groove pair of the ridges and grooves defines one of the segment, wherein the rotor is configured to rotate about an axis, wherein the track includes a height in each of the segments between a peak of a respective one of the ridges of the respective segment and a bottom of a respective one of the grooves of the respective segment;

a stator of the electrical machine; and a printed circuit board assembly stationary relative to the stator, the printed circuit board assembly encircling the shaft, including driver electronics of the electrical machine, and including a sensor facing the track, wherein the track and the sensor face each other in directions that are parallel to the axis, wherein the sensor is configured to generate an output that is decoupled from the diameter of the track and is related to the repeating sequence of segments, wherein a period of the output is related to the repeating sequence of the segments, wherein the sensor is a magnetic sensor.

* * * * *